Figure 1:
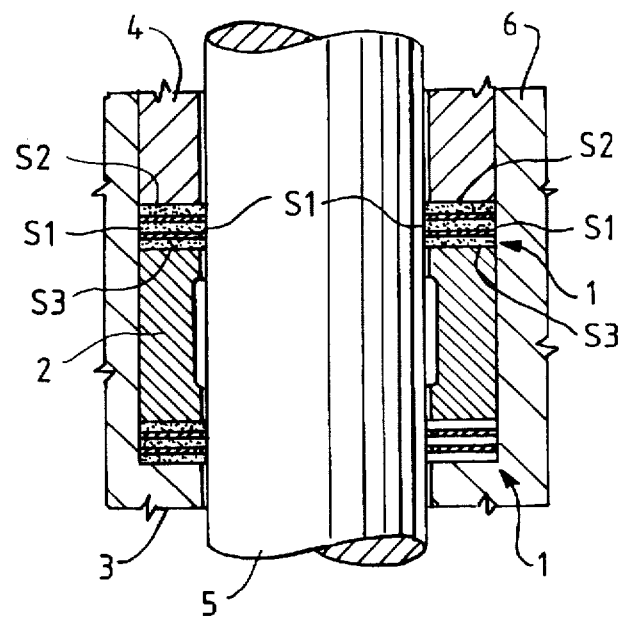

United States Patent [19]

Canani

[11] Patent Number: 5,791,653
[45] Date of Patent: Aug. 11, 1998

[54] SEALING RING FOR SLIDING UNITS OPERATING AT VERY LOW TEMPERATURES

[75] Inventor: Stefano Berni Canani, Monza, Italy

[73] Assignee: Cesare Bonetti S.p.A., Italy

[21] Appl. No.: 275,317

[22] Filed: Jul. 13, 1994

Related U.S. Application Data

[63] Continuation of Ser. No. 960,782, Oct. 14, 1992, abandoned.

[30] Foreign Application Priority Data

Oct. 21, 1991 [IT] Italy ................... MI91A2780

[51] Int. Cl.⁶ .................................................. F16J 15/00
[52] U.S. Cl. ........................ 277/125; 277/125; 277/233
[58] Field of Search ............................ 277/123, 125, 277/188 A, 227, 233, 235 R

[56] References Cited

U.S. PATENT DOCUMENTS

| | | | |
|---|---|---|---|
| 2,251,211 | 7/1941 | Armstrong | 277/213 |
| 2,537,230 | 1/1951 | Mueller | 277/233 X |
| 3,179,426 | 4/1965 | Duer | |
| 3,576,330 | 4/1971 | Gard | 277/235 R |
| 3,841,289 | 10/1974 | Meyers | 277/233 X |
| 4,116,451 | 9/1978 | Nixon et al. | 277/235 R X |
| 4,160,551 | 7/1979 | Nixon et al. | 277/235 R X |
| 4,350,346 | 9/1982 | Powler | 277/125 X |
| 4,394,023 | 7/1983 | Hinojosa | 277/125 X |
| 4,665,978 | 5/1987 | Luke | 277/235 R X |
| 4,892,320 | 1/1990 | Tuckmantel | |
| 4,911,972 | 3/1990 | Mercuri | 277/235 R X |

FOREIGN PATENT DOCUMENTS 3721967  3/1987  Germany.

Primary Examiner—Daniel G. DePumpo
Attorney, Agent, or Firm—Ladas & Parry

[57] ABSTRACT

Sealing ring (1) for sliding units (3.7) operating both at very low temperatures and at high pressures, comprising at least one pair of layers (1a) of graphite-based material alternating with at least one supporting ring (1b) made of metallic material.

3 Claims, 1 Drawing Sheet

SEALING RING FOR SLIDING UNITS OPERATING AT VERY LOW TEMPERATURES

This is a continuation of application Ser. No. 07/960,782 filed on Oct. 14, 1992 now abandoned.

The object of this invention is a sealing ring moving on sliding and/or rotating units which is particularly suitable for use at extremely low temperatures.

For installations of various types operating at high temperatures, particularly in steam power-stations and the like, there have hitherto been widely used sealing devices acting on the surface of rotating or sliding components, made with an asbestos base which ensured the necessary characteristics of resistance.

In particular with regard to pistons, for example for the operation of automatic valves, actuated by a process fluid such as water or steam up to temperatures of 550° C. and pressures of 250 bars, the seals are comprised of sliding rings which are subjected to severe mechanical stress.

Following recognition of the hazardous features of asbestos for the health of operators there has been imposed a ban on the use thereof, thus creating the problem of providing sliding sealing devices, usually in the form of rings, imparting a sliding seal against the relevant internal or external cylindrical surface and furthermore, if required, a front stationary seal made of non-asbestos material.

To this end there have been used materials of various types, but it has been found that the products currently available on the market are not suitable for the appointed purpose.

There have also been used experimentally sealing devices made of graphite, this being a material which can withstand fairly well the aforesaid operating conditions and imparts an optimum seal, but it is of extremely low mechanical strength and tends to flake and slip, particularly if exposed to a high-velocity flow.

There are also known special forms of graphite rings capable of withstanding the high temperature and pressure conditions described above.

All these proposed solutions, however, display serious shortcomings when the working conditions are characterized on the contrary by an extremely low temperature, as in the case of transport by road or rail by means of tankers for the conveyance of hazardous substances such as flammable and/or lethal fluids which, in addition to their self-cooling features, may encounter outside temperatures well below 0°, in particular lower than minus 15° C.

Under such conditions, the materials used for manufacturing the seats accommodating the sealing rings, as well as the rings themselves, tend to shrink rather than expand as is the case with high temperatures, each according to its own coefficient of expansion, causing enlargement of the seals resulting in leakage of fluid.

The same effect occurs during periods of temporary contact of the fluid at low temperature with the actual seals, inasmuch as the rapid albeit temporary drop in temperature may cause differential shrinkage of the materials as indicated above.

There is therefore posed the technical problem of providing a sealing device which is particularly suitable for operating under temperature conditions well below zero and furthermore displays adequate durability, exerting resistance both from a chemical and thermal viewpoint and from a mechanical viewpoint, even in the presence of dirty fluids in which there may be encountered inclusions of solid and abrasive substances, and which is moreover compatible with the generality of the materials normally used to make piston valves and the like.

Within the scope of the aforesaid problem, a further object of this invention is to provide a seal capable of being used indiscriminately with the most widely-varying materials in order to obviate the need for complicated choices to render compatible the connection between the sealing components and the materials used for manufacturing the locating seats, for example of valves, thus making it possible to eliminate the dimensional constraints intended to lessen the likelihood of seizure and also to reduce the manufacturing range, and therefore the range of stocks needed by the manufacturer and by the distributor in order to cater for various applications.

Such results are achieved by means of the present invention, which provides a sealing ring for sliding units operating at low or high temperatures and pressures.

Figure 2:
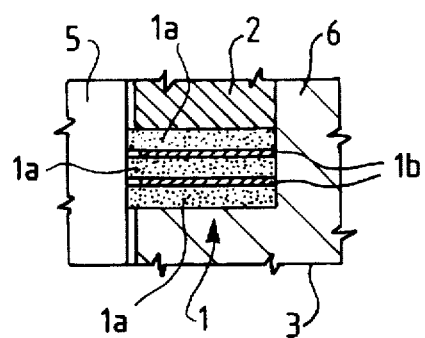
Figure 3:
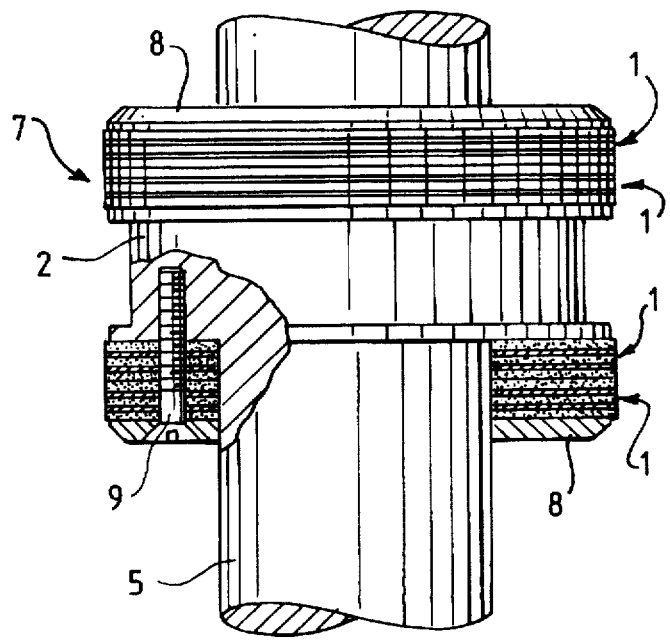

Further details may be obtained from the following description with reference to the attached drawings, which show:

In FIG. 1 : a sealing device fitted between a moving shaft and a fixed seat, according to a partial schematic cross-section;

In FIG. 2 : an enlarged detail cross-section of the seal according to the invention;

In FIG. 3 : the seal assembly according to the invention applied to a smooth barrel (not shown).

As illustrated in detail in FIG. 1, the seal assembly according to the invention is comprised of a pair of rings 1 separated by a spacer and secured as an assembly to the bottom of seat 3 by a retainer 4 or the like; within such rings there slides a shaft 5 of a piston or the like of a valve body 6.

Each ring 1 illustrated in enlarged cross-section in FIG. 2 is formed of annular layers of graphite 1a and metal supporting plates 1b alternating with one another so that the two opposite outer layers always consist of graphite 1a.

Metal supporting plate 1b, which may for assembly purposes only be made integral with graphite layer 1a by means of adhesives or the like, is preferably made of stainless steel or nickel and is of low thickness, whilst the thickness of graphite layer 1a is several times greater than that of metal plate 1b.

The function of the metal supporting plate is to provide sufficient support so as to facilitate the process of shaping rings 1, without impairing the sealing performance required of the graphite itself; it is however also possible to use pure, non-reinforced graphite, in cases where its brittleness is not an influencing factor.

Metal supporting rings 1b are conveniently made of a material withstanding process fluids; the inside diameter of the rings, that is to say towards the sliding member, is slighter greater than that of graphite rings 1a, so that contact with the sliding surface of piston 5 is only made by such graphite rings 1a. Each of the metal supporting rings has a thickness from 0.01 to 0.03 mm.

The adhesive used to hold together the graphite rings and the supporting rings does not have any special features and does not need to be capable of imparting resistance under the process conditions for which the sealing ring is provided; this does not however affect the efficient performance of the sealing ring, because the adhesive completes its task when the ring has been fitted to its seat; from that moment on the ring as a whole is secured to the housing and there is no longer any likelihood of its walls crumbling. Sealing rings 1 each comprise a number of graphite rings 1a exceeding two, one in relation to the diameter and overall thickness of such sealing ring; the distance between two consecutive supporting rings, that is to say the thickness of the graphite layer, ranges from 0.5 mm to a few millimetres; the thickness of the opposite layers of graphite 1a towards the outside of the ring is preferably about 0.5–1.5 mm and not greater than 2 mm.

The restriction concerning the thickness of graphite of the rings is intended to avoid having an excessive thickness exposed to the mechanical action of the process fluid and of the sliding members in contact with the actual sealing rings, which would bring about deterioration of the graphite.

Such arrangement, which provides for the presence of two graphite layers 1a on the head surfaces of the sealing ring, is suited to the case in which, as shown in FIG. 1, ring 1 is required to exert sealing action not only on the internal and external cylindrical surfaces, marked $S_1$ in the figure, but also on front surfaces $S_2$ and $S_3$: in this case sealing action on the front surfaces is provided by graphite layers 1a.

FIG. 3 shows the application of sealing rings 1 to a piston 7 designed to slide within a cylindrical barrel in order to operate as an actuator or the like.

According to such design, piston 7 integral with shaft 5 is provided with two pairs of sealing rings 1 of the type described above, separated by spacer 2, clamped by plate 8 secured via screws 9 to spacer 2 of piston 7.

In order to impart greater rigidity to the assembly, between rings 1 it is preferable to interpose a secondary supporting ring, not illustrated, of sufficient thickness in relation to the outside diameter of the piston so as to achieve rigid containment of rings 1. It is therefore obvious from the description provided above that the sealing rings according to the invention ensure improved performance features compared with conventional rings made of asbestos, which are no longer allowed to be used, displaying a lower coefficient of friction, greater durability and greater dimensional stability, particularly under operating conditions which provide for very low temperatures, without thereby bringing about sealing defects. Many alternatives may be introduced without thereby departing from the scope of this invention in regard to its general features.

I claim:

1. A sealing ring for a valve, said valve adapted for operations both at very low temperatures and at high pressures, said sealing ring comprising a plurality of annular layers, wherein said layers consist of at least one pair of flat layers of graphite-based material alternating with at least one interposed supporting flat layer of metallic material, whereby said layers of graphite-based material form the outer layers of the sealing ring and have a thickness ranging from 0.5 to 1.5 mm and said layer of metallic material having a thickness ranging from 0.01 to 0.03 mm so that contact with said sealing ring is made by said layers of graphite-based material.

2. A sealing ring according to claim 1 wherein said layers of graphite-based material are comprised of one or more rings clamped as an assembly, each made of pure graphite.

3. A sealing ring according to claim 1 wherein said layer of metallic materials are comprised of at least one of stainless steel and nickel.

* * * * *